(12) United States Patent
Burris et al.

(10) Patent No.: US 12,495,770 B2
(45) Date of Patent: Dec. 16, 2025

(54) PET TREAT POD AND CONTAINER SYSTEM

(71) Applicants: Yvonne S Burris, Maize, KS (US);
Brayden G Burris, Maize, KS (US);
Kiley B Burris, Maize, KS (US)

(72) Inventors: Yvonne S Burris, Maize, KS (US);
Brayden G Burris, Maize, KS (US);
Kiley B Burris, Maize, KS (US)

( * ) Notice: Subject to any disclaimer, the term of this patent is extended or adjusted under 35 U.S.C. 154(b) by 0 days.

(21) Appl. No.: 18/668,423

(22) Filed: May 20, 2024

(65) Prior Publication Data

US 2024/0381845 A1 Nov. 21, 2024

Related U.S. Application Data

(60) Provisional application No. 63/467,436, filed on May 18, 2023.

(51) Int. Cl.
*A01K 15/02* (2006.01)

(52) U.S. Cl.
CPC .................. *A01K 15/026* (2013.01)

(58) Field of Classification Search
CPC .................. A01K 15/025; A01K 15/026
See application file for complete search history.

(56) References Cited

U.S. PATENT DOCUMENTS

| | | | |
|---|---|---|---|
| 10,582,696 B1* | 3/2020 | Mullin | A01K 5/0114 |
| 2014/0360439 A1* | 12/2014 | Christensen | A01K 15/025 |
| | | | 119/709 |
| 2015/0114309 A1* | 4/2015 | Davison, III | A01K 15/026 |
| | | | 119/709 |
| 2016/0081305 A1* | 3/2016 | Williams | A01K 15/026 |
| | | | 119/709 |
| 2017/0020109 A1* | 1/2017 | Dewey | F16B 7/20 |
| 2017/0055498 A1* | 3/2017 | McNulty | F16B 7/04 |
| 2020/0113152 A1* | 4/2020 | Mcfarlane | A01K 15/026 |
| 2020/0288672 A1* | 9/2020 | Wolfe, Jr. | A01K 15/026 |

FOREIGN PATENT DOCUMENTS

WO WO-2016141404 A1 * 9/2016 ............ A01K 15/02

* cited by examiner

*Primary Examiner* — Trinh T Nguyen
(74) *Attorney, Agent, or Firm* — AVEK IP, LLC

(57) ABSTRACT

A container and pod system includes an elastomeric casing with a top and bottom and a bore forming a throat open at said casing top. The receptacle configured for containing objects is received in said casing bore. Objects within said receptacle, such as pet treats, medications and other consumables can be discharged through said throat.

1 Claim, 7 Drawing Sheets

SECTION A-A

SECTION D-D

SECTION E-E

PET TREAT POD AND CONTAINER SYSTEM

CROSS-REFERENCE TO RELATED APPLICATION

This application claims priority in U.S. Provisional Patent Application No. 63/467,436, Filed May 18, 2023, which is incorporated herein by reference.

BACKGROUND OF THE INVENTION

1. Field of the Invention

This invention relates generally to a pod and container system from which goods contained in the pod are dispensed to pets and animals. Goods include, but are not limited to treats, food, medications, and supplements.

2. Description of the Related Art

Pet treat containers and pods are available in various configurations and can be used to provide a convenient and safe way for goods to be distributed via pods held by the container. This container can provide pets or animals with a chewable toy, which can be made in various shapes and sizes to encourage play and strengthen teeth and jaws. The goods contained in the pet treat pods can be made in a variety of flavors and can be used as a training and reward system. Moreover, medication and supplements can be included in the pods. Pods can also come in a variety of edible, non-toxic casings. One advantage of the easily cleaned container is being able to fill the container using interchangeable pods. Another advantage relates to providing pets with objects to chew on, in lieu of chewing and damaging other items.

Pod fillings can vary according to the type of pet or animal. For example, cats tend to be fond of catnip and dogs enjoy peanut butter. Pet treat flavors can include various meats, cheeses, vegetables, fruits, etc.

Heretofore there has not been available a pet treat container with the advantages and features of the present invention. One advantage is the ability to hold and dispense from interchangeable pods. Another advantage is that the containers and pods can be easily accessed and opened for filling and refilling with goods. Other advantages include optimizing the pets' interest, portion control, chewability, pet safety, pet health, ease of use, and simplicity to clean and maintain.

BRIEF SUMMARY OF THE INVENTION

The present invention generally provides a pet treat container with an interior compartment configured for holding treats and goods within a pod. The container can be separated for placing the goods and pods internally. Pets can be allowed to play with and chew the container while consuming the goods in the pod.

BRIEF DESCRIPTION OF THE ILLUSTRATIONS

The illustrations constitute a part of this specification and include exemplary embodiments of the present invention illustrating various objects and features thereof.

DETAILED DESCRIPTION OF THE PREFERRED EMBODIMENTS

I. Introduction and Environment

Figure 1A:
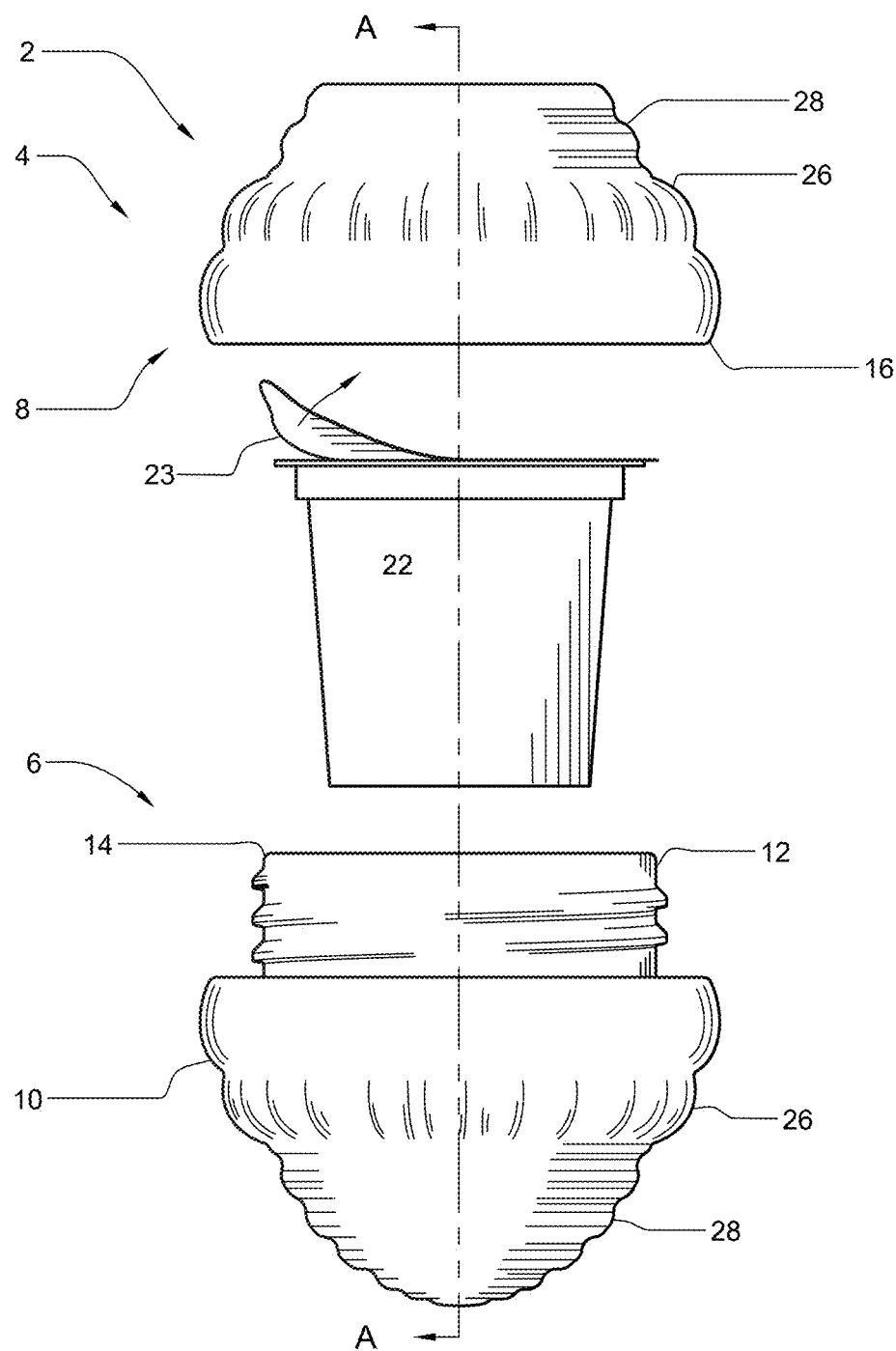
FIG. 1A is an exploded, elevational view of a pet treat pod, embodying an aspect of the present invention.
Figure 1B:
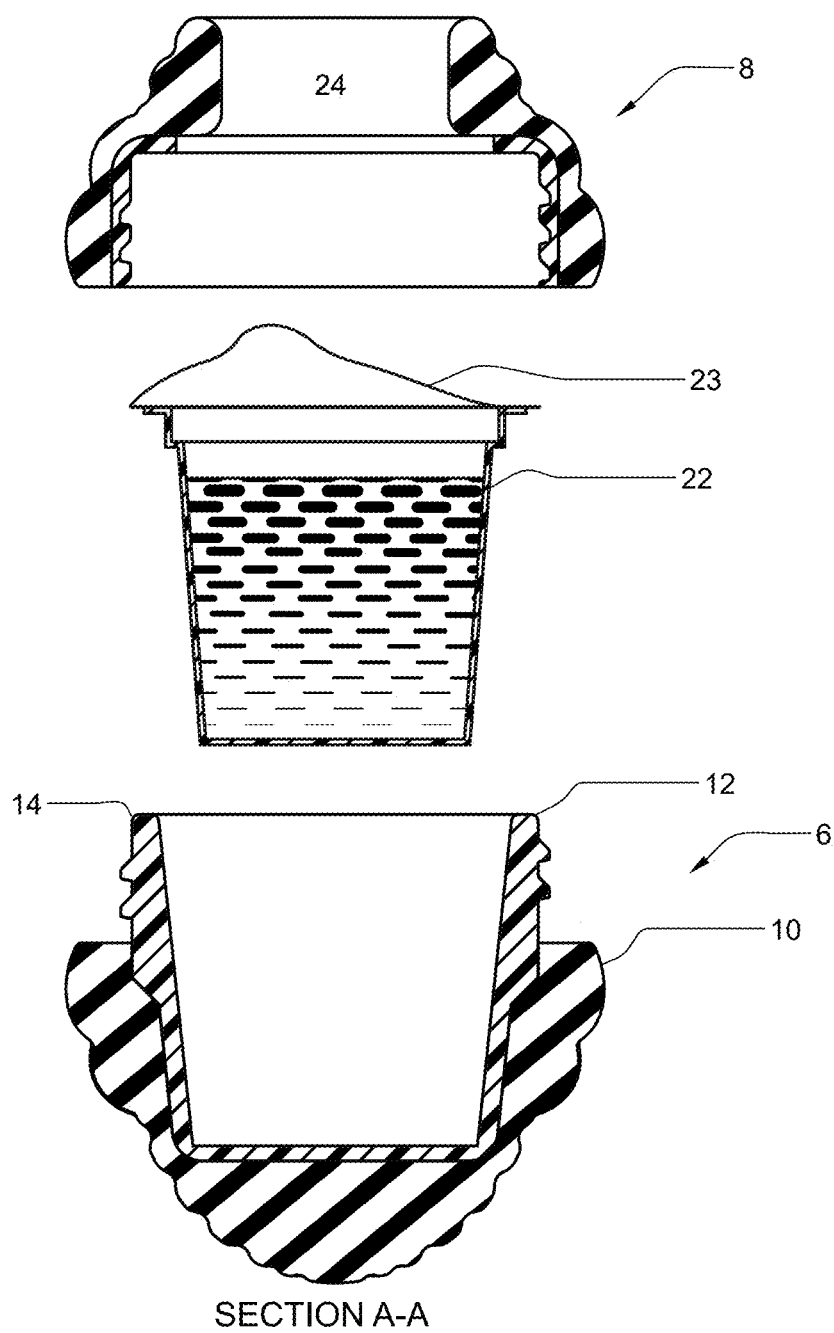
FIG. 1B is a cross-sectional view thereof taken generally along line A-A in FIG. 1A.
Figure 2A:
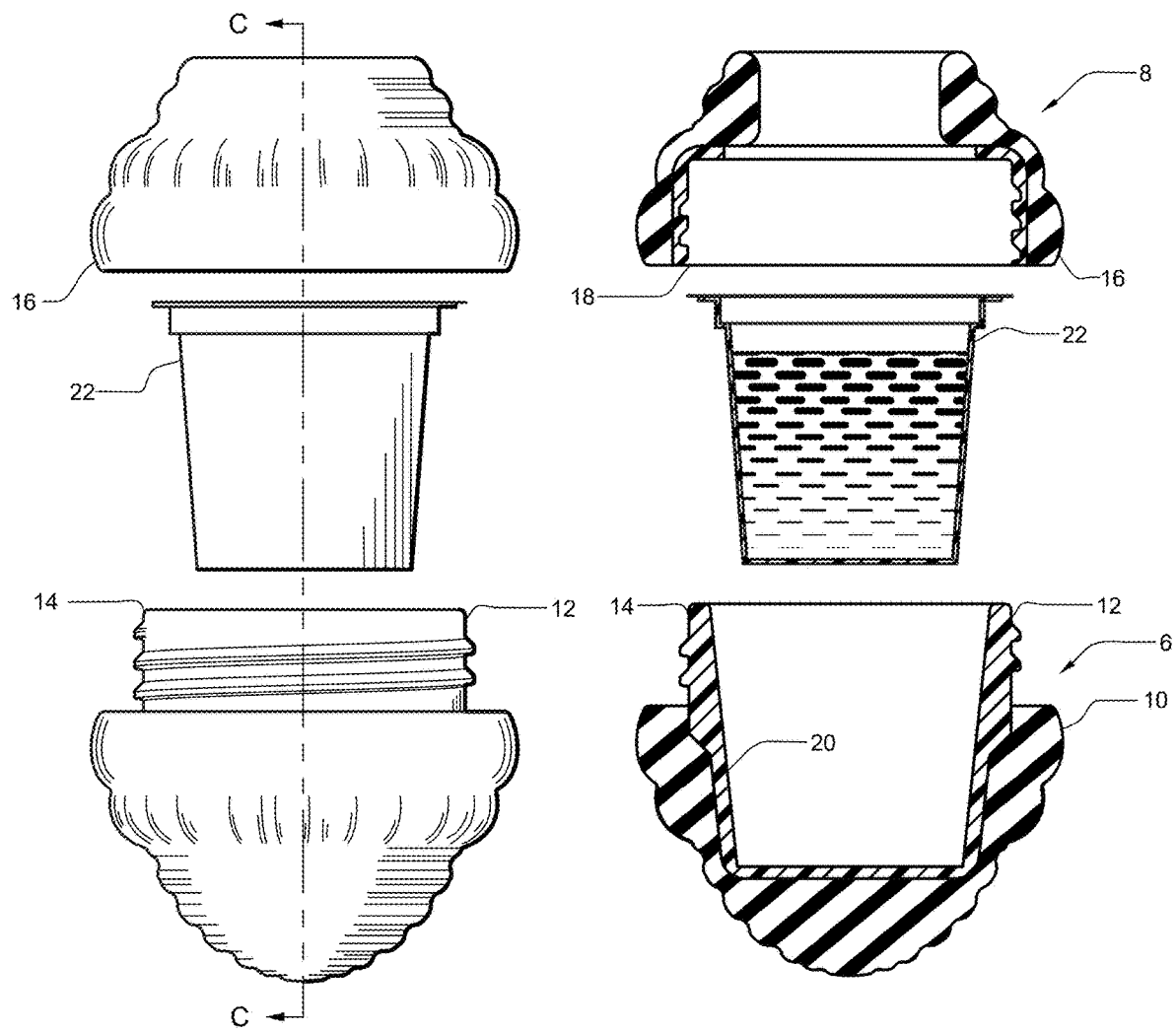
FIG. 2A shows exploded views of the pet treat container and pod system with threads.
Figure 2B:
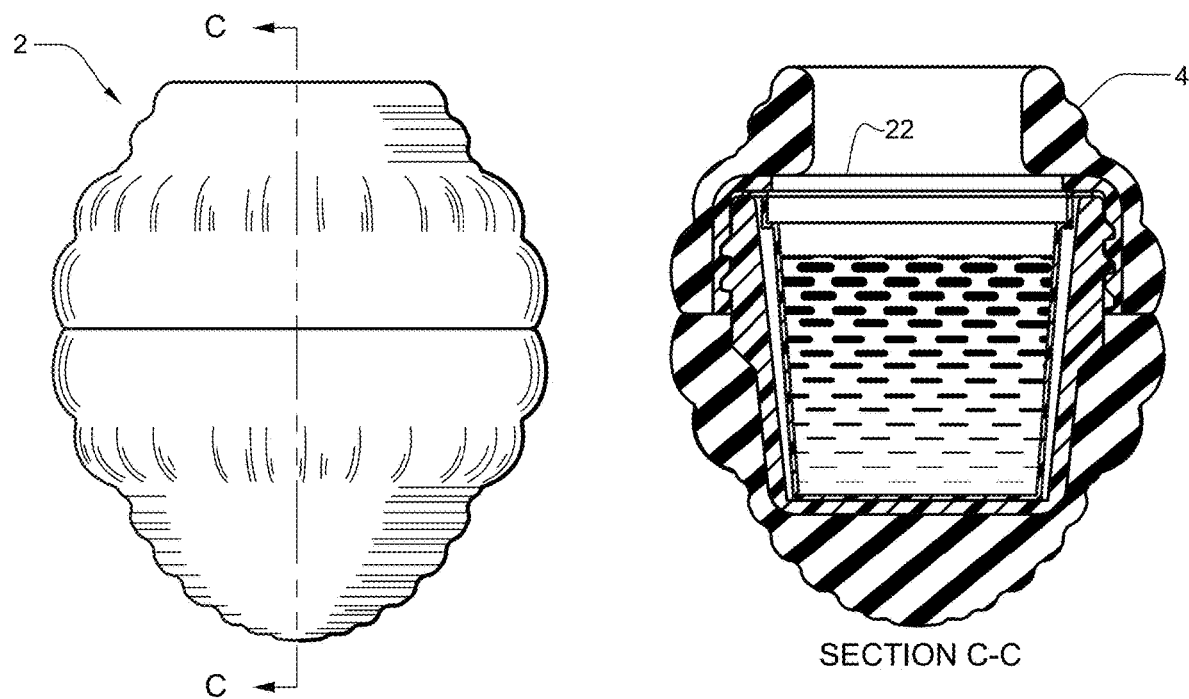
FIG. 2B shows elevational and cross-sectional views of the pet treat container and pod system.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Said terminology will include the words specifically mentioned, derivatives thereof and words of similar meaning.

II. Preferred Embodiment of Pet Treat Container and Pod 2

As shown in FIGS. 1A-2B, a container and pod system 2 generally includes a body 4 with a base assembly 6 and a removable top assembly 8. The base assembly 6 includes a casing 10, which receives a sleeve 12 with a male-threaded extension 14.

The top assembly 8 includes an upper casing 16, which receives an upper sleeve 18 with female-threads for threadably mounting on the base sleeve extension 14. The base sleeve 12 defines a receiver 20, which is configured to receive a receptacle 22 featuring a cover 23. With the top assembly 8 threadably secured on the base assembly 6, the container and pod system 2 has a throat 24, which is open to the receptacle 22. The body 4 is preferably fabricated with external ribs 26 and external recesses 28 to facilitate securely gripping the body 4 when attaching and detaching the assemblies 6, 8 by rotating them relative to each other.

In operation, the receptacle 22 receives a quantity of items, such as pet treats, dry pet food, medications, etc. For example, pet medications can be mixed with treats to encourage consumption. Moreover, the container and pod system 2 can be used for pet training whereby treats can be dispensed as rewards.

Figure 3:
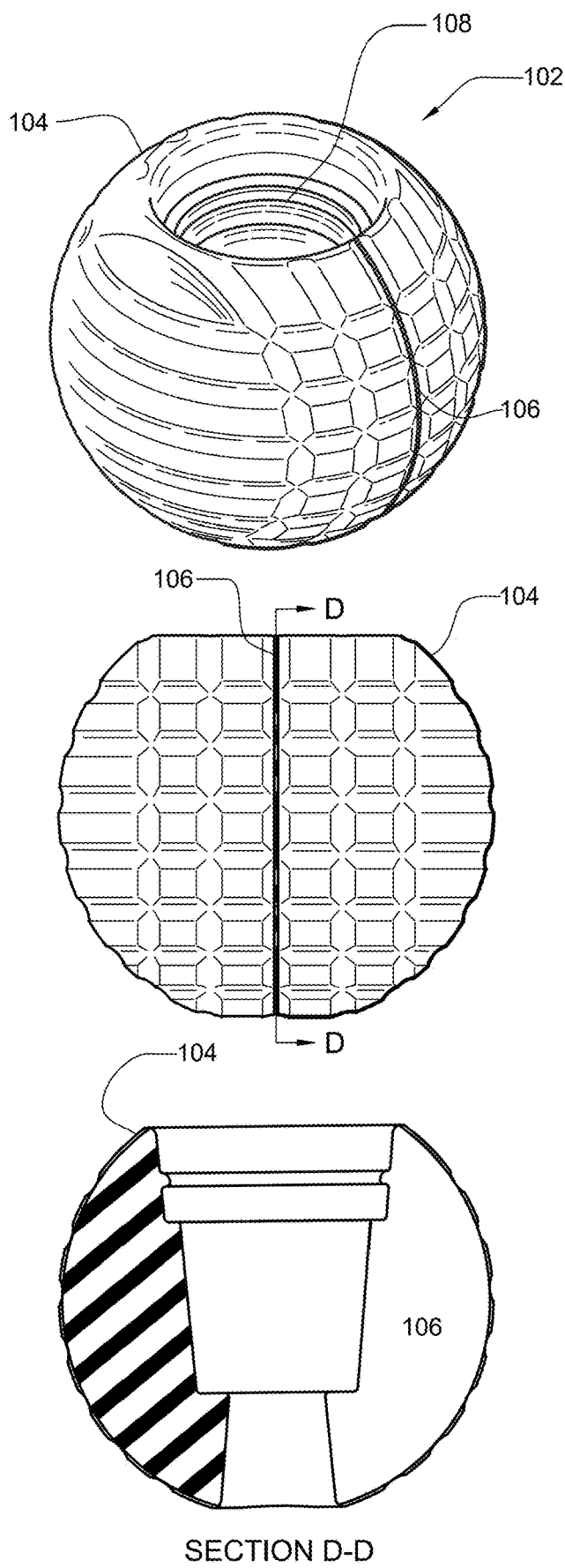
FIG. 3 shows: upper-perspective; side-elevational; and cross-sectional views of a peel-open style pet treat pod and container system comprising a first modified or alternative embodiment of the present invention.

FIG. 3 shows a first modified or alternative embodiment container and pod system 102 with a modified body 104 including a seam 106 allowing the container to be peeled open for separating the body 104 from an internal receptacle 108. The receptacle 108 can be extracted for cleaning, filling, etc. For example, pre-packaged treats in sealed containers could be placed in the system bodies, and opened when ready for use.

Figure 4:
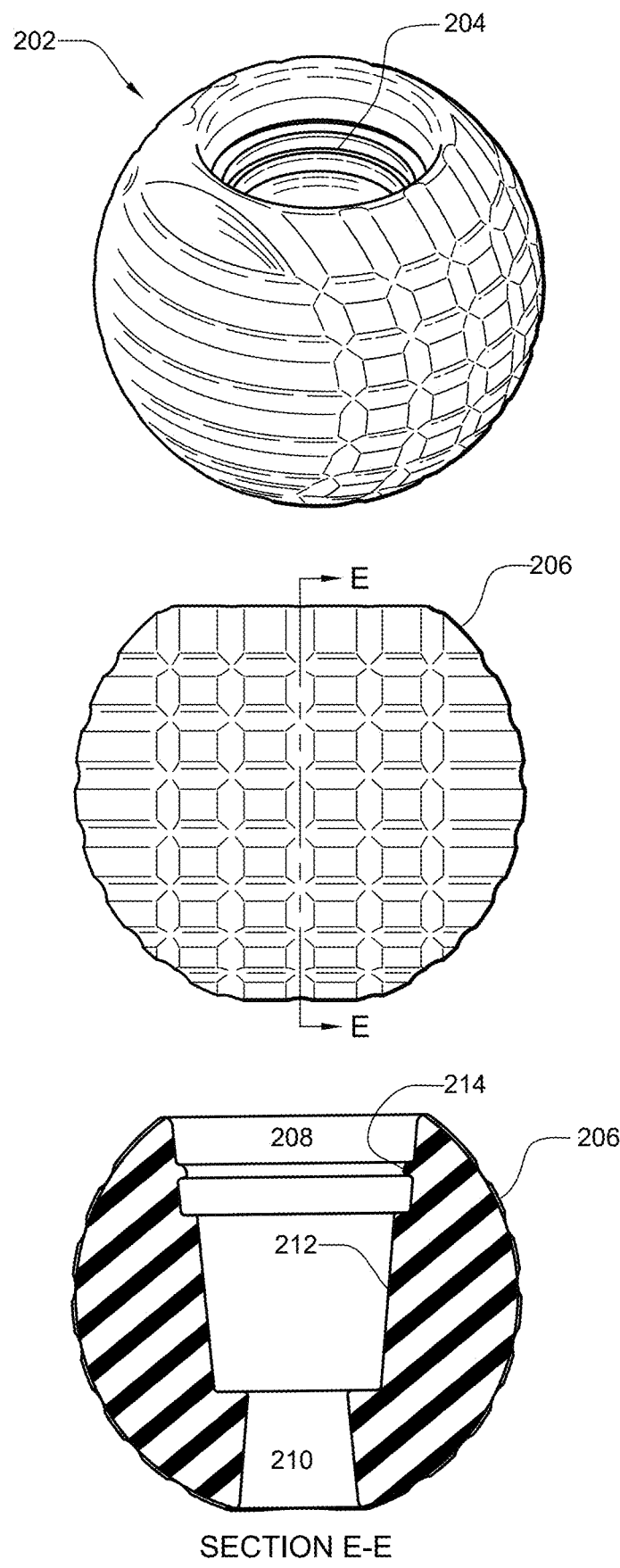
FIG. 4 shows: side-elevational; upper-perspective; and cross-sectional views of a second modified or alternative embodiment of the present invention with a press-in receptacle.

FIG. 4 shows a second modified or alternative embodiment container and pod system 202, wherein a receptacle 204 is pressed into a body 206 and frictionally retained therein. The body is configured with an upper opening 208 for filling and emptying the receptacle 204 and a lower opening 210 providing access to the receptacle for pushing it out of the body 206. The body 206 includes a bore 212 extending between the upper and lower openings 208, 210. An annular retainer ring 214 extends inwardly into the 206 in proximity to its upper opening 208 and is configured for retaining the receptacle 204 within the body 206.

Figure 5:
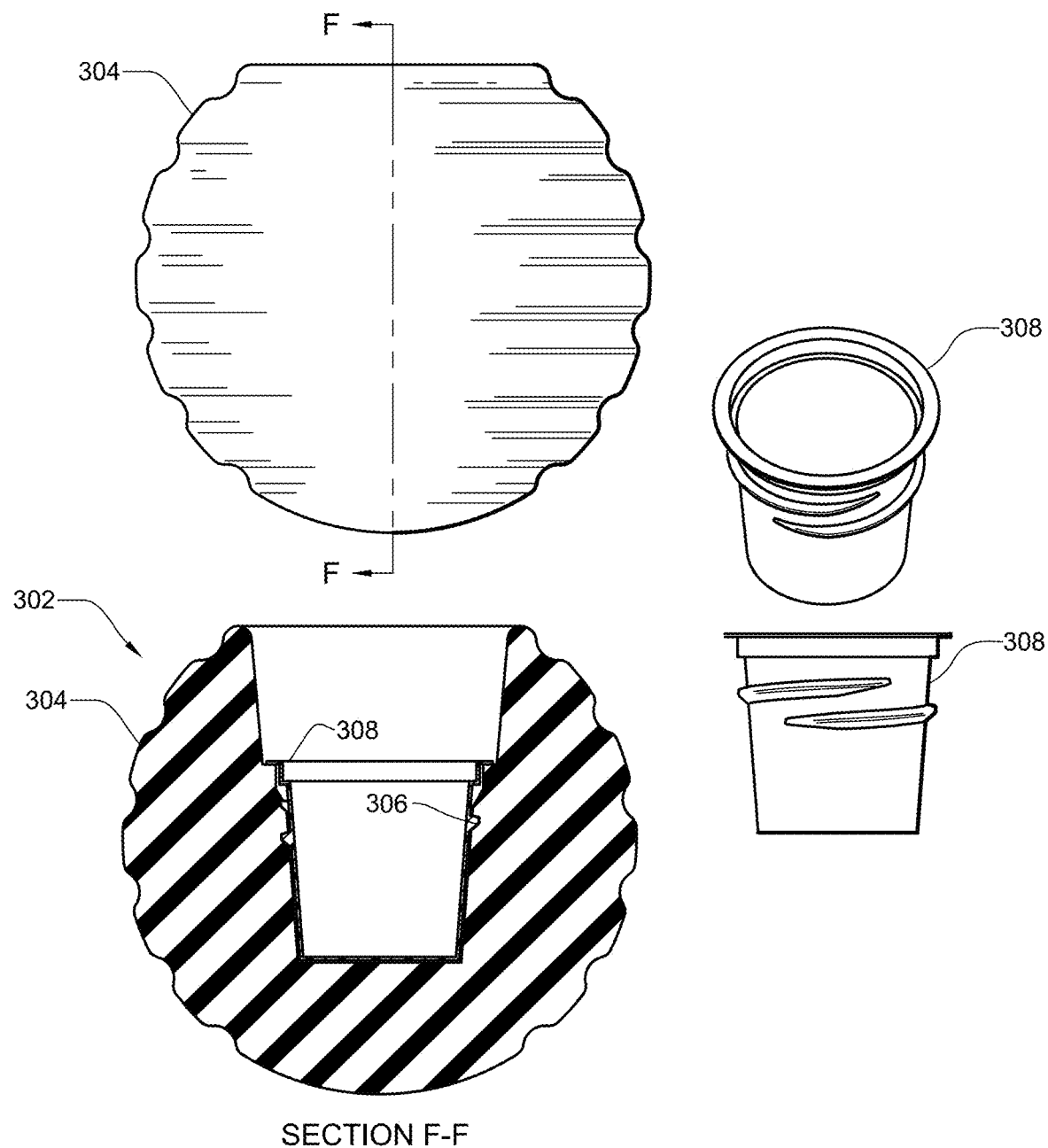
FIG. 5 shows: upper-perspective; and cross-sectional views of a pet treat container and pod system comprising a third modified or alternative embodiment of the present invention with a threaded receptacle.

FIG. 5 shows a container and pod system 302 comprising a third modified or alternative embodiment container and pod system 302 comprising a single-piece container with a body 304 including a female-threaded receiver 306. A corresponding male-threaded receptacle 308 is threadably received in the body 304.

As shown in the attached figures, the container and pod can be formed in various configurations with internal compartments for receiving and dispensing goods. Pets are encouraged to chew on the container by the aromas emanating from the goods in the enclosed pods. Such treats, foods, supplements, medications, or other goods can be easily accessed for feeding, rewarding and medicating pets.

Without limitation on the generality of useful materials, the containers and pods are preferably formed from non-toxic thermoplastics or rubbers. For example, thermoplastic polyurethane (TPU) with a durometer greater than 50 is generally suitable for the container and can be reused indefinitely. Pods may also be formed from edible goods or compostable materials. Pods may be constructed as a disposable, single use item or in a manner intended to be refilled and reused. Container and pod shapes, colors, sizes, materials, and fillings can vary based on the pet or animal they're intended to be used for.

III. Conclusion

It is to be understood that while certain embodiments and/or aspects of the invention have been shown and described, the invention is not limited thereto and encompasses various other embodiments and aspects.

The invention claimed is:

1. A container and pod system for containing and dispensing objects, which system includes:
   a body base assembly with an elastomeric lower casing;
      a rigid base sleeve with an upper, male-threaded extension, said base sleeve received in said lower casing;
   a body top assembly with an elastomeric upper casing; a top sleeve with a female-threaded bore configured for threadably receiving the male-threaded base sleeve extension; and a throat open at and extending from an exterior surface of the body top assembly into the top sleeve bore; and
   a receptacle removably received in the base sleeve and configured for receiving contents dischargeable through said throat, and having a removable cover for enclosing contents therein;
   said lower and upper casings include external surfaces with ribs and recesses configured for enabling a secure grip when engaged by a user.

* * * * *